(12) United States Patent
Curtis et al.

(10) Patent No.: US 9,415,874 B2
(45) Date of Patent: *Aug. 16, 2016

(54) CONFIGURABLE TRAY TABLE

(71) Applicant: The Boeing Company, Chicago, IL (US)

(72) Inventors: Vicki Ann Curtis, Stanwood, WA (US); Kayla Dunn, Cincinnati, OH (US); Ricardo Elizondo Costa, San Luis Potosi (MX); Colin Cansler Curry, Plano, TX (US); Sophie Prescott, Walnut Creek, CA (US); Lingyu Zhu, Cincinnati, OH (US); Sooshin Choi, Cincinnati, OH (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/855,856

(22) Filed: Sep. 16, 2015

(65) Prior Publication Data

US 2016/0001885 A1  Jan. 7, 2016

Related U.S. Application Data

(63) Continuation of application No. 13/874,990, filed on May 1, 2013, now Pat. No. 9,138,055.

(51) Int. Cl.

| | |
|---|---|
| *A47B 23/00* | (2006.01) |
| *B64D 11/06* | (2006.01) |
| *A47B 83/02* | (2006.01) |
| *B60N 3/00* | (2006.01) |
| *B60N 3/10* | (2006.01) |
| *A47B 13/08* | (2006.01) |

(52) U.S. Cl.
CPC .......... *B64D 11/0638* (2014.12); *A47B 13/088* (2013.01); *A47B 83/02* (2013.01); *B60N 3/004* (2013.01); *B60N 3/101* (2013.01); *B60N 3/102* (2013.01)

(58) Field of Classification Search
CPC ........ B60N 3/004; B60N 3/001; B60N 3/002; B60N 3/00; B60N 3/101; B60N 3/102
USPC ........... 108/92, 44, 42, 45, 43, 47, 48, 25, 26, 108/94; 297/146
See application file for complete search history.

(56) References Cited

U.S. PATENT DOCUMENTS

| | | | | |
|---|---|---|---|---|
| 4,121,377 | A * | 10/1978 | Allen ................... | A01G 9/1423 108/59 |
| 4,726,621 | A * | 2/1988 | Muller ................... | B60N 3/004 297/146 |
| 5,590,796 | A * | 1/1997 | Herman ................... | A47F 5/108 108/99 |
| D383,336 | S * | 9/1997 | Van Der Merwe ............ | D34/21 |
| 5,730,068 | A * | 3/1998 | Rioux, Jr. .................. | A47F 5/10 108/3 |

(Continued)

*Primary Examiner* — Jose V Chen
(74) *Attorney, Agent, or Firm* — Baldauff IP, LLC; Michael J. Baldauff, Jr.

(57) ABSTRACT

Methods provide for a configurable tray table. According to aspects of the disclosure, a tray rail is rotatable connected to a frame of a support assembly. Three tray table segments create a tray assembly having a multi-planar configuration and is coupled to the tray rail. A first tray table segment is pivotally connected to a second tray table segment via a first hinged longitudinal edge of the second tray table segment. A third tray table segment is pivotally connected to the second tray table segment along a second hinged longitudinal edge that is parallel to the first hinged longitudinal edge.

12 Claims, 7 Drawing Sheets

(56) References Cited

U.S. PATENT DOCUMENTS

| | | | | |
|---|---|---|---|---|
| 5,984,347 A * | 11/1999 | Blanc-Rosset | B60N 3/004 | 224/275 |
| 6,321,663 B1 * | 11/2001 | Rogers | A47B 43/00 | 108/100 |
| 6,494,533 B1 * | 12/2002 | Bohler | B60N 3/004 | 297/146 |
| 6,571,969 B2 * | 6/2003 | Larbaletier | A47F 5/12 | 108/106 |
| 6,758,518 B2 * | 7/2004 | Ingram | B60N 3/004 | 108/44 |
| 6,761,398 B2 * | 7/2004 | Bentley | B60N 2/22 | 297/135 |
| 7,740,312 B2 * | 6/2010 | Johnson, Jr. | A47B 83/02 | 108/44 |
| 8,826,830 B2 * | 9/2014 | Pajic | A47C 7/70 | 108/44 |
| 9,138,055 B2 * | 9/2015 | Curtis | A47B 83/02 | 108/44 |
| 2007/0283855 A1 * | 12/2007 | Pozzi | A47B 23/043 | 108/44 |
| 2011/0095577 A1 * | 4/2011 | Kennard | B64D 11/0015 | 297/146 |
| 2015/0061327 A1 * | 3/2015 | Millan | B60N 3/004 | 297/163 |

\* cited by examiner

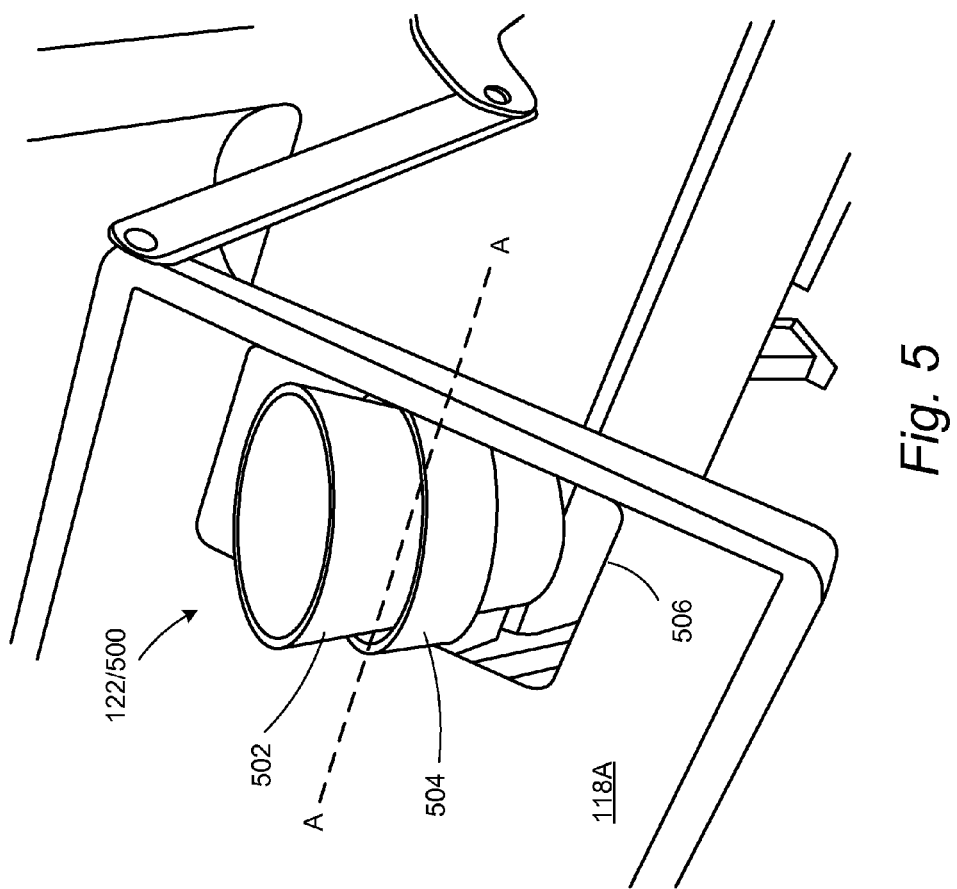

CONFIGURABLE TRAY TABLE

CROSS-REFERENCE TO RELATED APPLICATION

This application is a continuation of co-pending U.S. patent application Ser. No. 13/874,990, filed on May 1, 2013, entitled "Configurable Tray Table", which is hereby incorporated by reference in its entirety.

BACKGROUND

Tray tables are commonly used to provide commercial airline and other vehicle passengers with a surface for eating, drinking, working, and for convenient placement of items to be accessed during transit. Conventional aircraft and commercial vehicles arrange passenger seating in rows. Tray tables for use by the passengers are typically designed to have a single tray table surface that is connected to a framework that allows the tray table surface to be rotated upward and downward. The tray table is typically stowed in an upright position against the seat backs in front of the passengers. To use the tray table, a passenger will unlatch the tray table and rotate it downwards into a horizontal position so that the tray table surface creates a tabletop directly in front of the passenger, or even partially over the passenger's lap. When the passenger is finished with the tray table, the tray table may be rotated upward and returned to the stowed position.

While this conventional design is useful, it creates an inconvenient obstruction to other passengers, and even to a passenger using a tray table, during ingress and egress of the seat rows. For example, an airline passenger sitting in a window seat may need to exit the seat row to use a restroom or retrieve a personal item from an overhead bin. If a passenger in the middle seat is using a tray table, then that passenger would need to pick up the items from the tray table surface and stow the tray table in order to allow the window passenger to pass. This act may need to be repeated when the window passenger returns. There is currently no room within a seat row for a person to pass between a tray table that is in use and the passenger using the tray table.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Methods are described herein for providing a configurable tray table. According to one aspect, a tray rail is pivotally connected to a frame of a support assembly. The tray rail is configured to rotate to a position substantially coplanar with the frame to a raised position and to rotate downward from the raised position to a lowered position. A first tray table segment is pivotally connected to a second tray table segment along a first hinged longitudinal edge of the second tray table segment. A third tray table segment is pivotally connected to the second tray table segment along a second hinged longitudinal edge that is parallel to the first hinged longitudinal edge. The three tray table segments create a tray assembly having a multi-planar configuration. The tray assembly is coupled to the tray rail of the support assembly.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIG. 5 is a perspective view of a self-leveling cup holder for use with a configurable tray table according to various embodiments presented herein.

DETAILED DESCRIPTION

Figure 1:
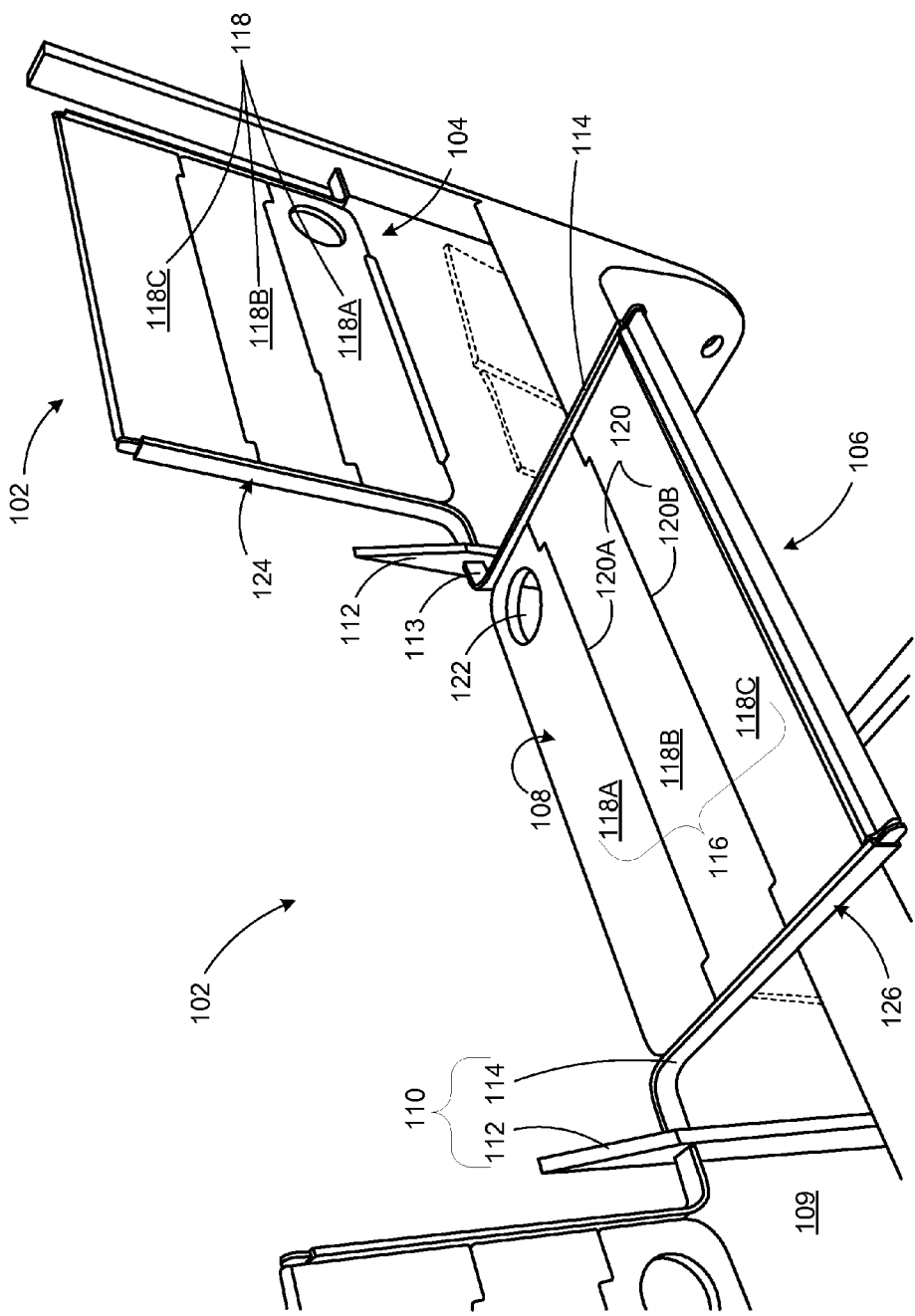
FIG. 1 is a perspective view of a configurable tray table in a full table configuration and a configurable tray table in a stowed configuration according to various embodiments presented herein.

The following detailed description is directed to a configurable tray table and corresponding use. As discussed above, conventional tray tables offer a single tray table surface that substantially occupies an entire space between a seated passenger and the seat back in front of the passenger when in use. The relatively large tray table surface associated with conventional tray tables is useful during meals or situations in which a maximum amount of surface space is desired for placing items, but is cumbersome and problematic for ingress and egress within the seat row.

In particular, there are often times at which a passenger utilizes a tray table for a single drink or to support a single book, electronic reader, tablet, personal game system, or other device that does not occupy a lot of space. Even in these situations, the user must remove the item, close and latch the tray table, allow a person to ingress or egress the seat row, and then unlatch the tray table, lower it, and replace the item on the tray table surface. This process may then be repeated if the person returns to his or her seat after leaving the row.

Utilizing the concepts and technologies described herein, a configurable tray table provides a passenger with multiple configurations depending on the desired use. The disclosure herein describes a tray table that provides a stowed configuration and a full table configuration similar to the stowed and lowered configurations of conventional tray tables. However, embodiments herein also provide a small table configuration and a folded configuration that is not possible with conventional designs. In particular, the small table configuration maintains the configurable tray table in a stowed configuration against a seat back in order to maximize the space between seat rows for ingress and egress, but allows for a segment of the configurable tray table to be rotated away from the stowed tray table to a horizontal position. This small table configuration provides a relatively small tray table surface for placing a drink or small item when the full tray table surface is not needed. Even with the tray table segment positioned in the small table configuration, space is maintained between the small table surface and the passenger for ingress and egress between the seat rows.

The folded configuration according to various embodiments of the configurable tray table described below provides an inclined table surface for holding a tablet, electronic reader, smartphone or other personal computing device, electronic gaming device, DVD or other video playback device, book, magazine, documents, or any other applicable material in an inclined position. In contrast, a conventional tray table merely provides a flat table surface, which is useful for eating, but does not facilitate the use of devices and material that are traditionally held upright in a user's hands during use.

In the following detailed description, references are made to the accompanying drawings that form a part hereof, and which are shown by way of illustration, specific embodiments, or examples. Referring now to the drawings, in which like numerals represent like elements through the several figures, a configurable tray table and method for employing the same according to the various embodiments will be described.

FIG. 1 shows a perspective view of a configurable tray table 102 configured in a stowed configuration 104 and a configurable tray table 102 configured in a full table configuration 106. According to various embodiments, the configurable tray table may be described as having two coupled assemblies, a support assembly 110 and a tray assembly 116. The support assembly 110 may include a frame 112 that is attached, or configured for attachment to, a structure 109. The structure 109 may include any component to which the configurable tray table 102 is attached, such as a passenger seat, bulkhead, or other appropriate structure. It should be understood that the configurable tray table 102 is described herein in the context of a passenger aircraft. However, the configurable tray table 102 may be utilized in any environment in which a table surface that may be removed or stowed may be desired, including but not limited to, ships, aircraft, busses, trains, recreational vehicles, theaters, auditoriums, and the like. Accordingly, the structure 109 may include any structural component of a vehicle or building.

The support assembly 110 also includes a tray rail 114 that is pivotally coupled to the frame 112. According to the example shown in FIG. 1, each configurable tray table 102 includes two parallel tray rails 114 coupled to opposite sides of the tray assembly 116, although the use of a single tray rail 114 or more than two tray rails 114 for each configurable tray table 102 is contemplated and within the scope of this disclosure. The support assembly 110 is configured with the appropriate structural and mechanical features to allow for the rotation of the frame end 113 of each tray rail 114 with respect to the frame 112, as well as to allow for the engagement and disengagement of the various components of the tray assembly 116 as they rotate with respect to the tray rails 114 as described in further detail below. Moreover, the tray rails 114 may be configured to allow for the translation of the tray assembly 116 forward and aft along a length of the tray rails 114 to allow for some adjustment of the distance of the tray assembly 116 to the passenger or user of the configurable tray table 102.

The tray assembly 116 may include any number of tray table segments. According to this embodiment, the tray assembly 116 includes a first tray table segment 118A, a second tray table segment 118B, and a third tray table segment 118C (collectively referred to as "tray table segments 118"). Each tray table segment 118 is pivotally coupled to an adjacent tray table segment 118. For example, the first tray table segment 118A and the second tray table segment 118B share a first hinged longitudinal edge 120A. Similarly, the second tray table segment 118B and the third tray table segment 118C share a second hinged longitudinal edge 120B. The rotation of the tray table segments 118 around the hinged longitudinal edges will be described in greater detail below with respect to the multi-planar configurations of various embodiments.

According to various embodiments, the stowed configuration 104 and the full table configuration 106 shown in FIG. 1 are generally referred to as coplanar configurations. Coplanar configurations include all configurations of the tray assembly 116 in which the tray table segments 118 are positioned adjacent and coplanar to one another to create a substantially flat tray surface 108. In other words, the top surfaces of all of the tray table segments are coplanar, creating a flat surface for use as a tray by a passenger, or for efficient low-profile storage against a seat back or structure 109. In the stowed configuration 104, the substantially flat tray surface 108 of the tray assembly 116 is coplanar with the tray rail 114 when the tray rail 114 is in a raised position 124. In contrast, when the substantially flat tray surface 108 is positioned coplanar with the tray rail 114 in a lowered position 126, the configurable tray table 102 is arranged in the full table configuration 106.

A cup holder 122, such as a self-leveling cup holder 500 as shown in FIG. 5, may be positioned in one or more tray table segments 118 according to various embodiments. Although the cup holder 122 is shown in FIG. 1 as being positioned in the first tray table segment 118A, it should be appreciated that any tray table segment 118 may contain a cup holder 122 without departing from the scope of this disclosure. Aspects of a self-leveling cup holder 500 will be described in greater detail below with respect to FIG. 5.

Figure 2:
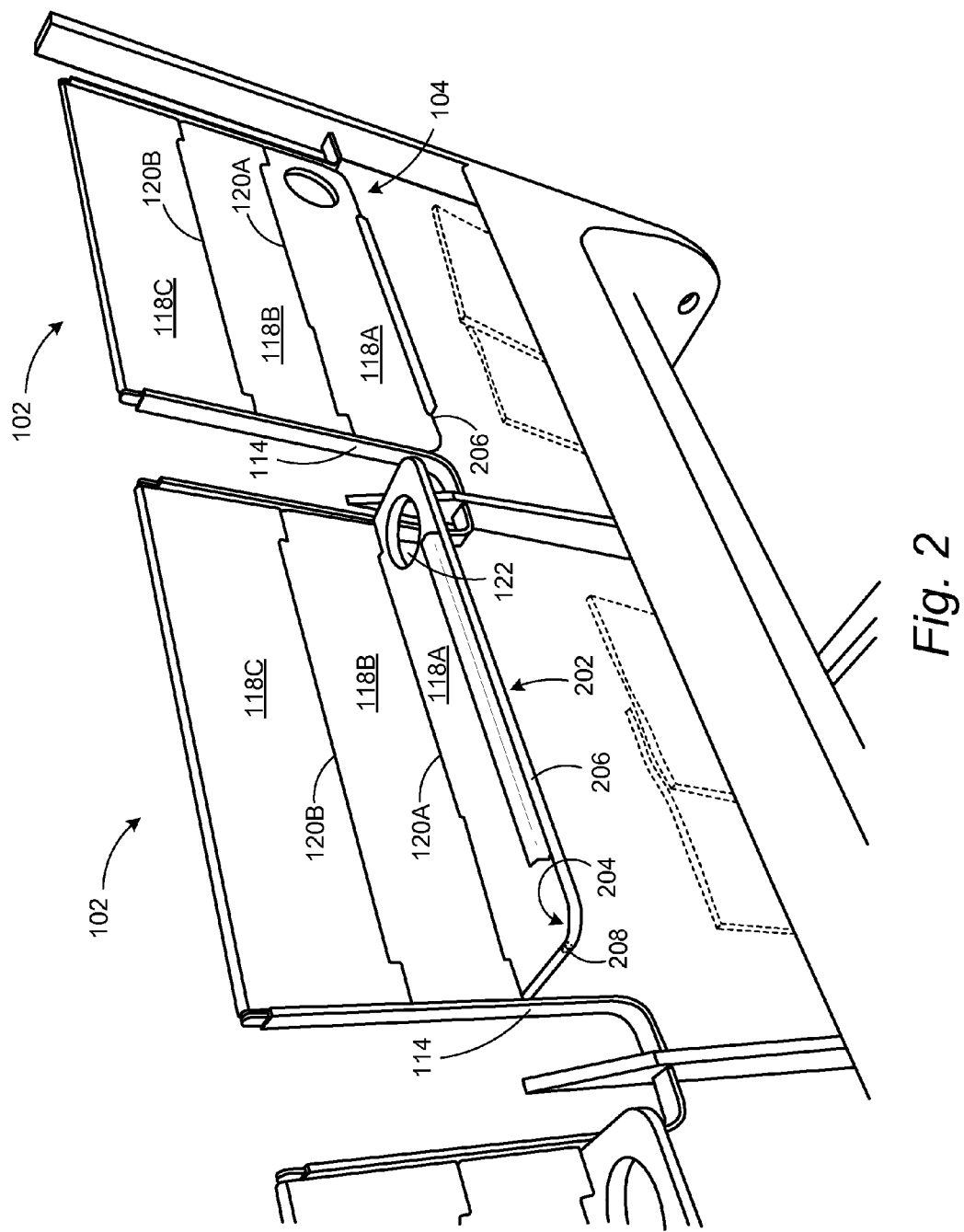
FIG. 2 is a perspective view of a configurable tray table in a small table configuration according to various embodiments presented herein.

FIG. 2 shows a perspective view of a configurable tray table 102 in the small table configuration 202. The small table configuration 202 is one of two multi-planar configurations described herein. Multi-planar configurations include all configurations of the tray assembly 116 in which the tray table segments 118 are arranged so that the surfaces of the tray table segments 118 occupy at least two planes. Specifically, two multi-planar configurations will be described, including multiple implementations of the small table configuration 202 with respect to FIGS. 2 and 3, and a folded configuration 402 with respect to FIGS. 4A and 4B. FIG. 2 shows a small table configuration 202 that provides a small table surface 204 that allows a user to place a drink or small item on the configurable tray table 102 while maintaining enough space between the configurable tray table 102 and the user to allow a person to pass between seat rows.

According to this embodiment, the configurable tray table 102 is placed in the stowed configuration 104. From the stowed configuration 104, the first tray table segment 118A is rotated outwards and upwards to a substantially horizontal position to create the small table configuration 202 with the small table surface 204. Prior to or during rotation of the first tray table segment 118A, the outer longitudinal edge 206 of the first tray table segment 118A may be uncoupled from the tray rail 114 utilizing the latching mechanism 208. The latching mechanism 208 may be any known structural, mechanical, or magnetic latch capable of securing a tray table segment 118 in a coplanar configuration with the tray rail 114. When uncoupled, the first tray table segment 118A may be rotated around the first hinged longitudinal edge 120A and secured into position to provide the small table surface 204. According to one embodiment, the first tray table segment 118A may be held in the substantially horizontal position using friction cams, mechanical stops, mechanically operated cams, or similar mechanisms.

A cup holder, and specifically a cup holder 122 according to one embodiment, may be located within the first tray table segment 118A to provide the user with a cup holder in all tray table configurations. It should be appreciated that a cup holder may be located within any or all of the tray table segments 118 depending on the particular implementation, or to provide the user with various options with respect to all configurations. The cup holder 122 will be described in further detail below.

Figure 3:
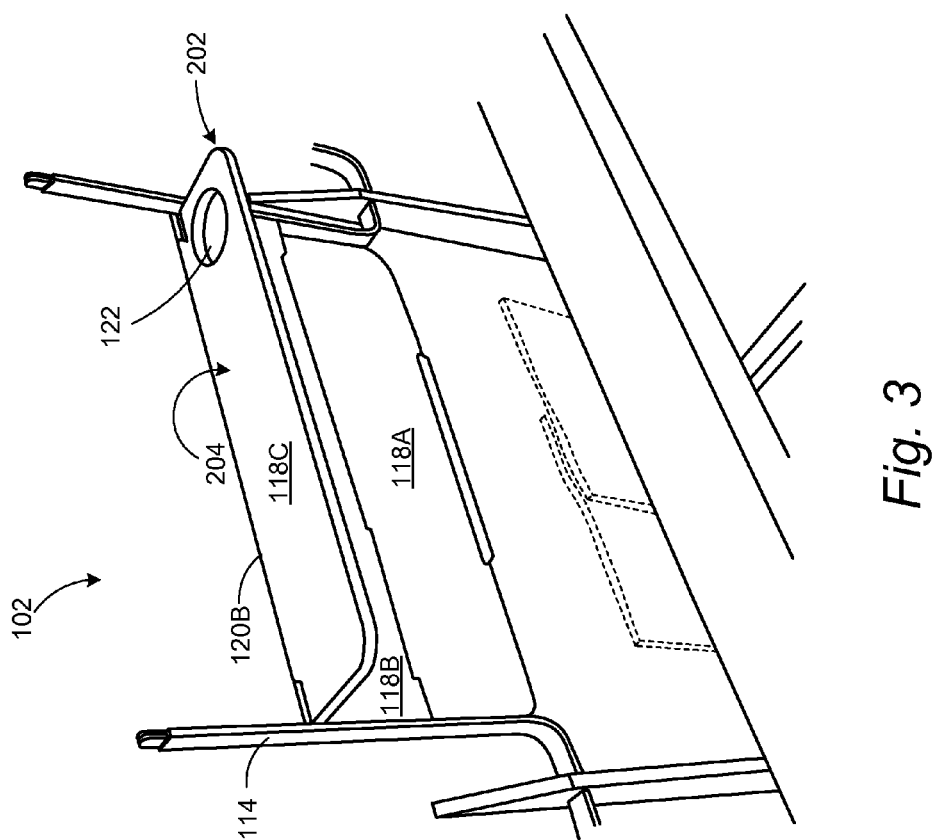
FIG. 3 is a perspective view of a configurable tray table in an alternative small table configuration according to various embodiments presented herein.

FIG. 3 shows an alternative embodiment of the small table configuration 202. In this embodiment, the third tray table segment 118C is rotated outwards and downwards from the stowed configuration 104 to a substantially horizontal position to create the small table configuration 202 with the small table surface 204. This embodiment is similar to the small table configuration 202 described above with respect to FIG. 2, but would vary the height of the small table surface 204 from the floor as compared to the prior example.

Figure 4A:
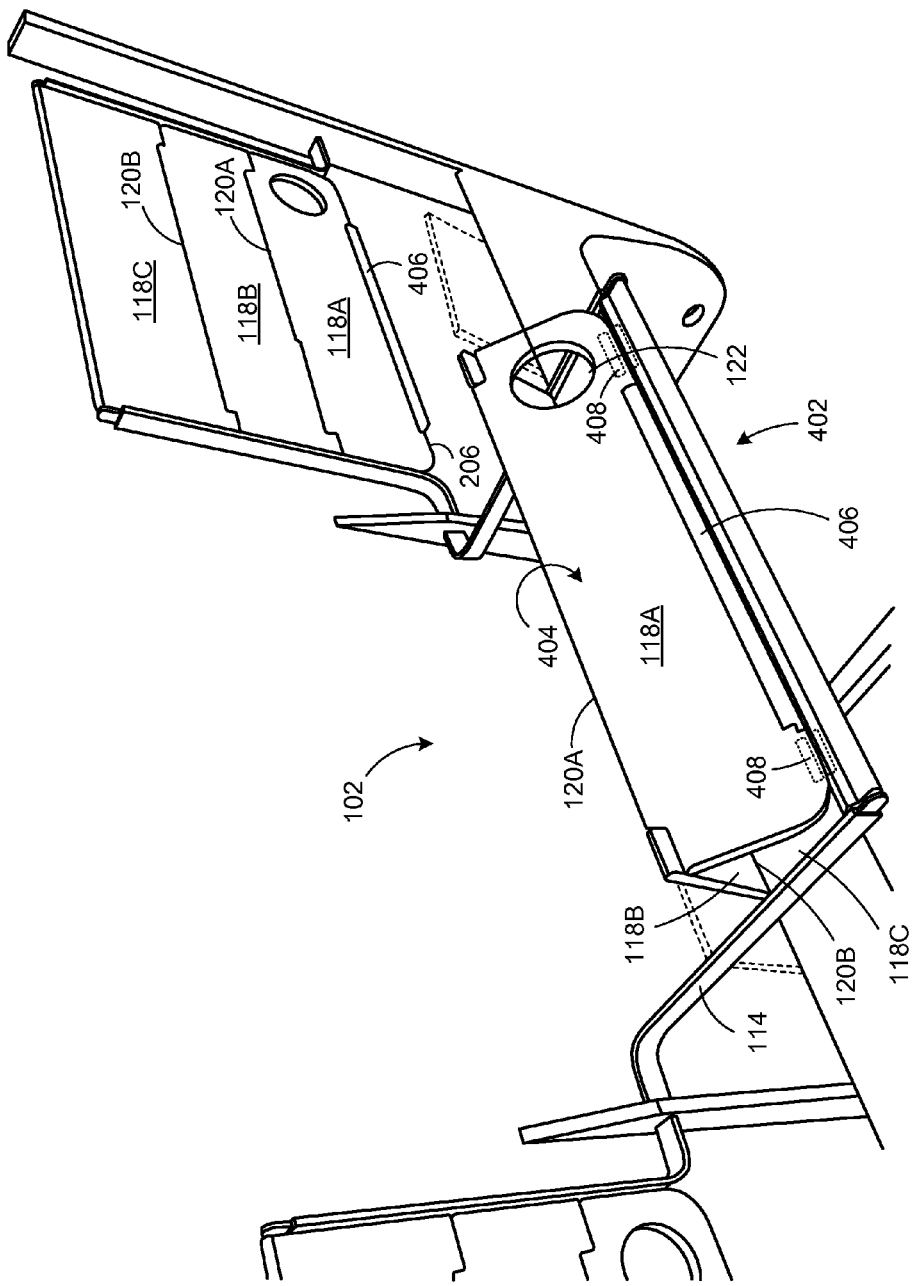
FIG. 4A is a perspective view of a configurable tray table in a folded configuration according to various embodiments presented herein.

Turning now to FIG. 4A, the folded configuration 402 will now be described. As mentioned above, the folded configuration 402 provides an inclined table surface 404 for holding a tablet, electronic reader, smartphone or other personal computing device, electronic gaming device, DVD or other video playback device, book, magazine, documents, or any other applicable material in an inclined position. To transition the configurable tray table 102 to the folded configuration 402, the tray assembly 116 is first placed in the full table configuration 106. From the full table configuration 106, the outer longitudinal edge 206 of the first tray table segment 118A may be uncoupled from the tray rail 114 utilizing the latching mechanism 208 as described above. The first tray table segment 118A is rotated upwards around the first hinged longitudinal edge 120A. The second tray table segment 118B is rotated upwards around the second hinged longitudinal edge 120B. The outer longitudinal edge 206 of the first tray table segment 118A is brought forward until contact is made with the third tray table segment 118C.

The first tray table segment 118A may be secured to the third tray table segment 118C via coupling mechanisms 408. Coupling these segments may occur via any number and type of coupling mechanisms 408, including but not limited to, magnets, structural features on the tray table segments 118 that engage one another, a groove or channel within the third tray table segment 118C into which the outer longitudinal edge 206 is positioned, or frictional mechanisms.

Figure 4B:
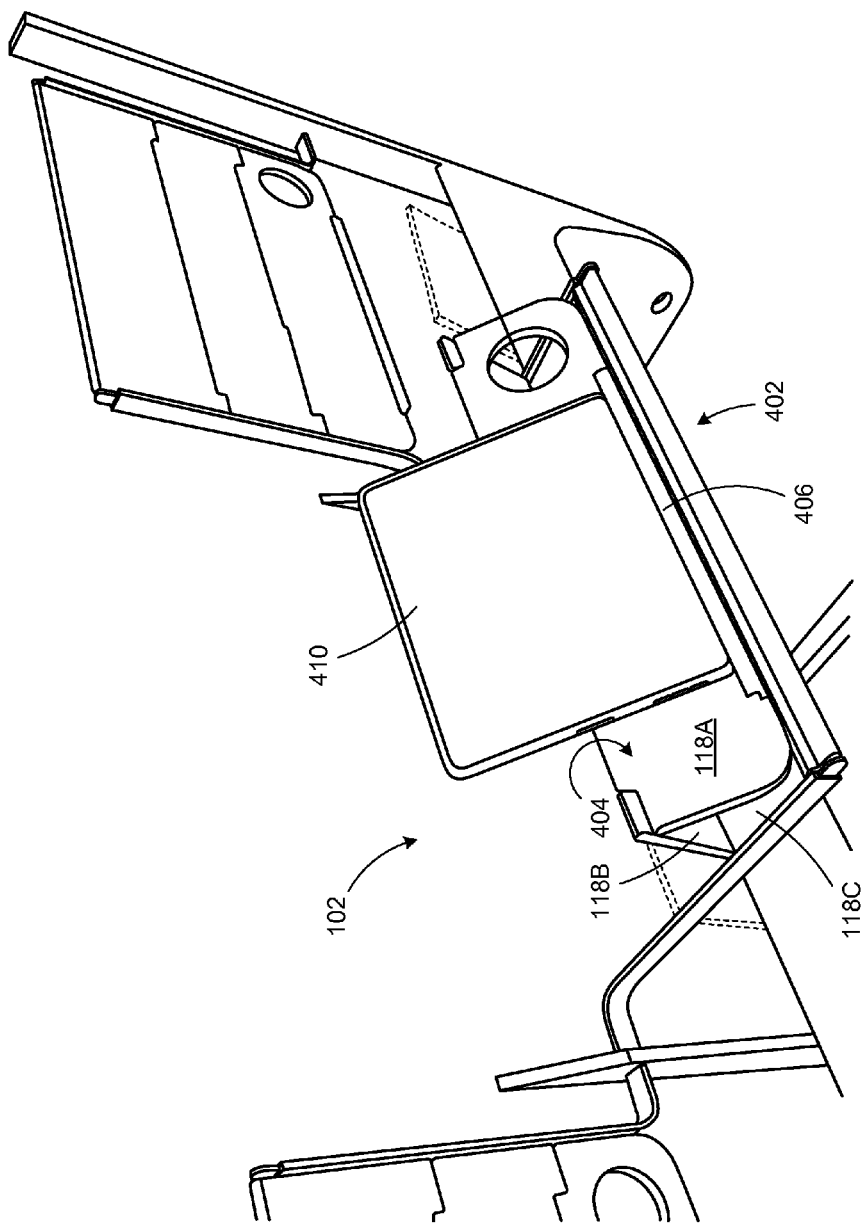
FIG. 4B is a perspective view of the configurable tray table of FIG. 4A in the folded configuration illustrating the support of a tablet device according to various embodiments presented herein.

The first tray table segment 118A may include a device retaining ledge 406 configured as a ridge, projection, or shelf that supports a bottom edge of an item placed on the inclined table surface 404 as seen in FIG. 4B. FIG. 4B shows the configurable tray table 102 in the folded configuration 402 with an electronic tablet device resting on the inclined table surface 404 and device retaining ledge 406. The use of the folded configuration 402 secures items at a favorable viewing angle, freeing the user's hands or allowing for a more relaxed viewing position. It should be appreciated that the configurable tray table 102 may include an alternative mechanism for securing an item to the inclined table surface 404, including but not limited to suction cups, elastic material, or surface material that increases frictional characteristics of the inclined table surface 404.

FIG. 5 shows an example of a cup holder 122 configured as a self-leveling cup holder 500. The self-leveling cup holder 500 retains a cup 502 in an upright position regardless of the configuration of the configurable tray table 102. According to one embodiment, the self-leveling cup holder 500 includes a retaining ring 504 that is rotatably secured within a cup holder aperture 506. The cup 502 is placed within the retaining ring 504. Because the cup 502 is free to rotate around axis A, the weight of the contents of the cup maintain the cup 502 in an upright position. The precise size, shape, and configuration of the self-leveling cup holder 500 is not limited to the example shown in FIG. 5.

Figure 6:
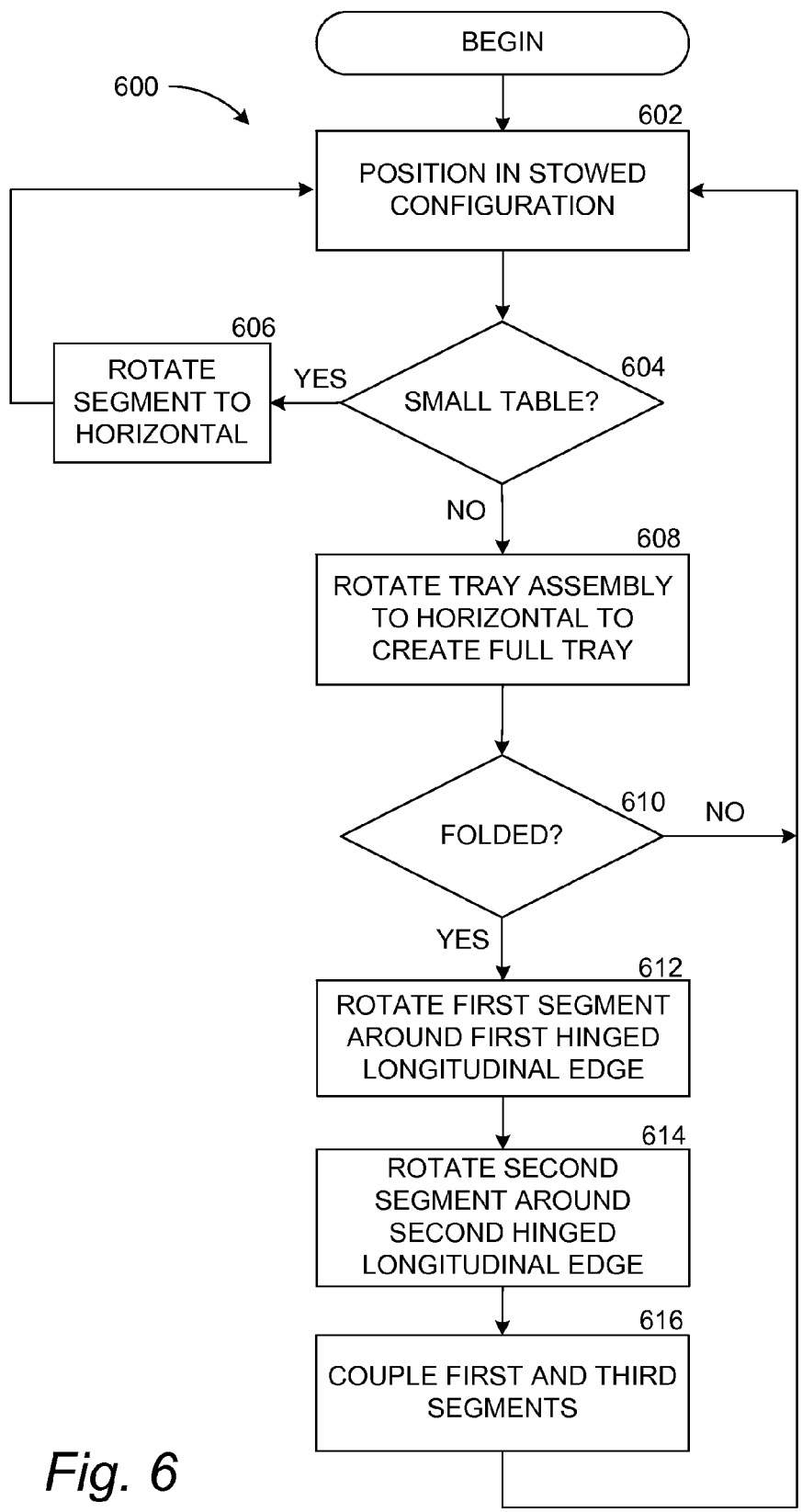
FIG. 6 is a flow diagram showing a method of configuring a tray table according to various embodiments presented herein.

Turning now to FIG. 6, an illustrative routine 600 for configuring a tray table will now be described in detail. It should be appreciated that more or fewer operations may be performed than shown in the figures and described herein. These operations may also be performed in a different order than those described herein.

The routine 600 begins at operation 602, where the configurable tray table 102 is positioned in the stowed configuration 104. As described above, to position the configurable tray table 102 in the stowed configuration 104, the tray assembly 116 is configured with a substantially flat tray surface 108 that is coplanar with the tray rails 114. The tray assembly 116 is then raised until the tray rails 114 are substantially coplanar with the frame 112 so that the tray assembly 116 abuts the structure 109. The configurable tray table 102 may then be latched or otherwise secured in the stowed configuration 104.

From operation 602, the routine 600 continues to operation 604, where a decision is made as to whether the small table configuration 202 is desired. If the small table configuration 202 is desired, then the routine 600 proceeds to operation 606, where a tray table segment 118 is rotated from the coplanar configuration to the substantially horizontal configuration to create the small table configuration 202. As described and shown above, the tray table segment 118 that is used to provide the small table surface 204 may be either the first tray table segment 118A or the third tray table segment 118B according to alternative embodiments. When the user is finished with the small table configuration 202, the routine 600 returns to operation 602 and proceeds as described above.

If, however, at operation 604, the small table configuration 202 is not desired, then the routine 600 continues to operation 608, where the tray assembly 116 is unlatched and rotated downward with the tray rails 114 to a horizontal position to create the full table configuration 106 that provides a substantially flat tray surface 108 for use by the passenger. From operation 608, the routine 600 continues to operation 610, where a decision is made as to whether a folded configuration 402 is desired. If not, then the routine 600 returns to operation 602 and proceeds as described above.

However, if at operation 610, a determination that the folded configuration 402 is desired, then the routine 600 continues to operation 612 and the first tray table segment 118A is uncoupled from the tray rails 114 and rotated upward from the full table configuration 106 around the first hinged longitudinal edge 120A. At operation 614, the second tray table segment 118B is also rotated upward around the second hinged longitudinal edge 120B. The routine 600 continues to operation 616, where the outer longitudinal edge 206 of the first tray table segment 118A makes contact with and is coupled to the third tray table segment 118C. As described above, the coupling of the first and third tray table segments may occur through any suitable mechanism, including having the outer longitudinal edge 206 rest on the surface of, or engage with a structural feature of, the third tray table segment 118C. The routine 600 then returns to operation 602 where the configurable tray table 102 is returned to the stowed configuration 104 and the routine 600 repeats as described above.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A method of providing a configurable tray table, the method comprising:
    pivotally connecting a tray rail of a support assembly to a frame of the support assembly, the tray rail configured to rotate to a position substantially coplanar with the frame to a raised position and to rotate downward from the raised position to a lowered position;
    pivotally connecting a first tray table segment to a second tray table segment along a first hinged longitudinal edge of the second tray table segment;
    pivotally connecting a third tray table segment to the second tray table segment along a second hinged longitudinal edge of the second tray table segment to create a tray assembly comprising a multi-planar tray configuration, the second hinged longitudinal edge parallel to the first hinged longitudinal edge; and
    coupling the tray assembly to the tray rail of the support assembly.

2. The method of claim 1, further comprising coupling the frame to an aircraft structure such that the raised position is substantially abutting an aircraft seat back.

3. The method of claim 1, further comprising:
    providing a cup holder aperture in a tray table segment; and
    connecting a retaining ring within the cup holder aperture via two opposing attachment locations such that the retaining ring rotates around an axis intersecting the two opposing attachment locations of the retaining ring within the cup holder aperture.

4. The method of claim 1, further comprising securing the first tray table segment, the second tray table segment, and the third tray table segment in a coplanar configuration such that when the tray rail is in the raised position, the configurable tray table is configured in a stowed configuration, and when the tray rail is in the lowered position, the configurable tray table is configured in a full table configuration.

5. The method of claim 1, further comprising releasably securing the first tray table segment to the tray rail such that when the second tray table segment and the third tray table segment are secured in a coplanar configuration with the tray rail in the raised position, and the first tray table segment is released from the tray rail to pivot upward around the first hinged longitudinal edge, the multi-planar tray configuration comprises a small table configuration.

6. The method of claim 1, further comprising releasably securing the third tray table segment to the tray rail such that when the first tray table segment and the second tray table segment are secured in a coplanar configuration with the tray rail in the raised position, and the third tray table segment is released from the tray rail to pivot downward around the second hinged longitudinal edge, the multi-planar tray configuration comprises a small table configuration.

7. The method of claim 1, wherein coupling the tray assembly to the tray rail of the support assembly comprises:
    securing the tray assembly to the tray rail via at opposing ends of the second hinged longitudinal edge such that
        the first tray table segment is entirely releasable from the tray rail,
        the second tray table segment is releasable from the tray rail at the first longitudinal edge and secured to the tray rail at the second longitudinal edge, and
        the third tray table segment is releasable from the tray rail at an edge parallel to and opposite the second hinged longitudinal edge and secured to the tray rail at the second longitudinal edge.

8. The method of claim 1, further comprising attaching a device retaining ledge to an edge of the third tray table segment parallel to and opposite the second hinged longitudinal edge, the device retaining ledge configured to support an item placed against the third tray table segment when the multi-planar configuration of the tray assembly comprises a folded configuration.

9. The method of claim 8, wherein the folded configuration comprises:
    the first tray table segment rotated around the first hinged longitudinal edge; and
    the second tray table segment rotated around the second hinged longitudinal edge until an outer longitudinal edge of the first tray table segment contacts the third tray table segment.

10. The method of claim 9, further comprising providing a coupling mechanism associated with the outer longitudinal edge of the first tray table segment and the third tray table segment configured to secure the first tray table segment to the third tray table segment when the tray assembly is configured in the folded configuration.

11. The method of claim 10, wherein the coupling mechanism comprises a magnetic coupling device.

12. The method of claim 10, wherein the coupling mechanism comprises a channel within the third tray table segment into which the outer longitudinal edge is positioned.

* * * * *